United States Patent
Kunihiro

(10) Patent No.: US 9,001,338 B2
(45) Date of Patent: Apr. 7, 2015

(54) PRINT CONTROL APPARATUS, PRINT CONTROL METHOD, AND COMPUTER-READABLE RECORDING MEDIUM FOR CORRECTING PRINT POSITION

(71) Applicant: Canon Kabushiki Kaisha, Tokyo (JP)

(72) Inventor: Syunichi Kunihiro, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/024,464

(22) Filed: Sep. 11, 2013

(65) Prior Publication Data

US 2014/0078523 A1    Mar. 20, 2014

(30) Foreign Application Priority Data

Sep. 14, 2012 (JP) ................................ 2012-203093

(51) Int. Cl.
*G06K 15/00* (2006.01)
*B41J 2/13* (2006.01)
*G06K 15/02* (2006.01)
*B41J 11/00* (2006.01)
*B41J 13/12* (2006.01)

(52) U.S. Cl.
CPC .............. *B41J 2/13* (2013.01); *G06K 15/1842* (2013.01); *G06K 15/02* (2013.01); *B41J 11/0035* (2013.01); *B41J 13/12* (2013.01)

(58) Field of Classification Search
CPC ........ B41J 2/13; G06K 15/02; G06K 15/1842
USPC ........................... 358/1.5, 498, 1.2, 1.12, 488
See application file for complete search history.

(56) References Cited

U.S. PATENT DOCUMENTS

| 4,974,974 | A | * | 12/1990 | Yoshida et al. | ................. 400/56 |
| 5,828,818 | A | * | 10/1998 | Anzai | ........................... 358/1.18 |
| 5,918,990 | A | * | 7/1999 | Abumehdi | ............... 400/120.17 |
| 6,633,736 | B1 | * | 10/2003 | Park | ................................ 399/66 |
| 8,508,784 | B2 | * | 8/2013 | Miyata | ........................ 358/1.18 |
| 2004/0141198 | A1 | * | 7/2004 | Otsuki | ........................ 358/1.12 |
| 2005/0046657 | A1 | * | 3/2005 | Seki et al. | ........................ 347/19 |
| 2007/0046709 | A1 | * | 3/2007 | Stenzel et al. | ................... 347/16 |
| 2007/0098475 | A1 | * | 5/2007 | Stenzel et al. | ............... 400/624 |
| 2008/0240832 | A1 | * | 10/2008 | Kugimachi | ................... 400/582 |

FOREIGN PATENT DOCUMENTS

| JP | 62-38261 B2 | 8/1987 |
| JP | 2009-46271 A | 3/2009 |

* cited by examiner

*Primary Examiner* — Benny Q Tieu
*Assistant Examiner* — Quyen V Ngo
(74) *Attorney, Agent, or Firm* — Canon USA, Inc., IP Division

(57) ABSTRACT

An apparatus includes an acquisition unit and a controller. The acquisition unit is configured to, in a case of a recording medium having different thicknesses along a direction crossing a feeding direction in which the recording medium is fed by a feeding unit, acquire correction information that is set on the basis of an orientation of the recording medium in a case where the recording medium is fed by the feeding unit. The controller is configured to move a print start position of a print unit in the direction crossing the feeding direction on the basis of the correction information acquired by the acquisition unit.

14 Claims, 8 Drawing Sheets

| NAME | SIZE | | POSITION OF FOLDED PORTION | |
|---|---|---|---|---|
| | W | H | RIGHT | LEFT |
| SHEET TYPE A | 2475 | 5700 | −100 | 100 |
| SHEET TYPE B | 2481 | 5552 | −100 | 100 |
| SHEET TYPE C | 2126 | 4843 | −110 | 110 |

FIG. 8
| ORIENTATION OF IMAGE | 0 | 90 | 180 | 270 |
|---|---|---|---|---|
| POSITION OF FOLDED PORTION | RIGHT | LEFT | LEFT | RIGHT |
| DIRECTION OF PRINTING ⬇ | 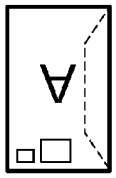 | 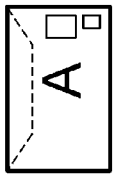 | 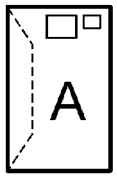 | 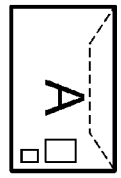 |
FIG. 9
| NAME | SIZE | | ORIENTATION OF IMAGE | | | |
|---|---|---|---|---|---|---|
| | W | H | 0 | 90 | 180 | 270 |
| SHEET TYPE A | 2475 | 5700 | −100 | 100 | 100 | −100 |
| SHEET TYPE B | 2481 | 5552 | −100 | 100 | 100 | −100 |
| SHEET TYPE C | 2126 | 4843 | −110 | 110 | 110 | −110 |

PRINT CONTROL APPARATUS, PRINT CONTROL METHOD, AND COMPUTER-READABLE RECORDING MEDIUM FOR CORRECTING PRINT POSITION

BACKGROUND OF THE INVENTION

1. Field of the Invention

The present invention relates to a print control apparatus, a print control method, and a non-transitory computer-readable recording medium for realizing excellent printing by correcting a print position.

2. Description of the Related Art

In recent years, printing apparatuses have handled a wide range of printing that includes not only conventional business printing, such as printing of documents or calculation results, but also, for example, printing of photographs, graphic printing, printing of envelopes, and direct mail printing. Thus, high-definition printing using various types of printing paper has been requested. For example, there has been a demand for a printing apparatus that can perform printing on not only sheets of paper that are typically used, but also sheets of special paper such as postcards or envelopes. Here, regarding such a sheet of special paper having a folded portion (a flap) such as an envelope, the thickness of the folded portion of the sheet of special paper and the thickness of an unfolded portion of the sheet of special paper are different from each other. Accordingly, during feeding of a recording medium having different thicknesses, the recording medium is displaced due to the difference between the thicknesses. Thus, a problem that printing at a correct position is not possible occurs.

For this reason, an image forming apparatus has been proposed, which has a weighting unit that applies, to a recording medium which is placed in a paper feed tray, a weight from the top of the recording medium (Japanese Patent Laid-Open No. 2009-46271).

However, for example, in the case where the thickness of a folded portion of an envelope is comparatively large, there is a problem that printing at a correct position is not possible in some cases even when a weight is applied to the envelope by the weighting unit.

SUMMARY OF THE INVENTION

According to one aspect, the present invention provides a print control apparatus, a print control method, and a non-transitory computer-readable recording medium that have solved the problems of the related art. Furthermore, according to another aspect, the present invention provides an apparatus, a method, and a non-transitory computer-readable recording medium that can more certainly realize printing at a desired position on a recording medium.

An apparatus according to the present invention includes an acquisition unit and a controller. The acquisition unit is configured to, in a case of a recording medium having different thicknesses along a direction crossing a feeding direction in which the recording medium is fed by a feeding unit, acquire correction information that is set on the basis of an orientation of the recording medium in a case where the recording medium is fed by the feeding unit. The controller is configured to move a print start position of a print unit in the direction crossing the feeding direction on the basis of the correction information acquired by the acquisition unit.

Further features of the present invention will become apparent from the following description of exemplary embodiments with reference to the attached drawings.

BRIEF DESCRIPTION OF THE DRAWINGS

FIG. 8 is an explanatory diagram of the relationships between a state in which a recording medium is set and the position of a folded portion in a second embodiment.

FIG. 9 is a diagram of the relationships among the type of recording medium, the position of the folded portion, and a correction value for a print position in a print control apparatus according to the second embodiment.

DESCRIPTION OF THE EMBODIMENTS

First Embodiment

Hereinafter, embodiments of the present invention will be described in details with reference to the drawings. Note that the present invention is not limited to any of the embodiments described below.

Figure 1:
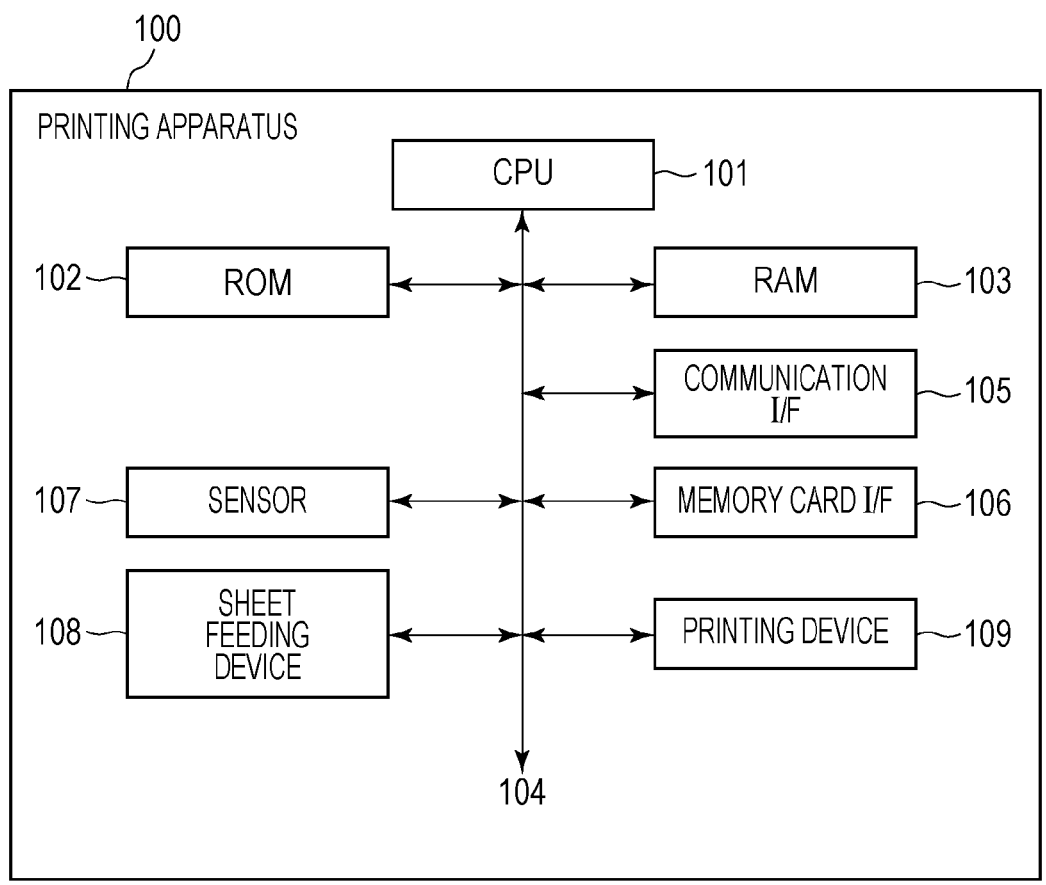
FIG. 1 is block diagram of a print control apparatus according to a first embodiment.

FIG. 1 is block diagram of a print control apparatus according to a first embodiment. Note that, in the present embodiment, the present invention will be described by providing, as an example, a printing device in which a sheet of paper is fed as a recording medium.

A printing apparatus 100 includes a central processing unit (CPU) 101 that is used to execute a program, a read-only memory (ROM) 102 in which a program is stored, and a random-access memory (RAM) 103 that is used to store information when a program is executed. The CPU 101, the ROM 102, and the RAM 103 are connected to each other using a system bus 104. A communication interface (I/F) 105 that acquires data to be used in printing from an external apparatus, and a memory card I/F 106 that is used to acquire data from an external storage, such as a memory card, are connected to the system bus 104.

Furthermore, a sensor 107 that is a device used in a print operation, a sheet feeding device 108 that feeds a sheet of paper, and a printing device 109 that performs printing on a fed sheet of paper are also connected to the system bus 104.

Figure 2A:
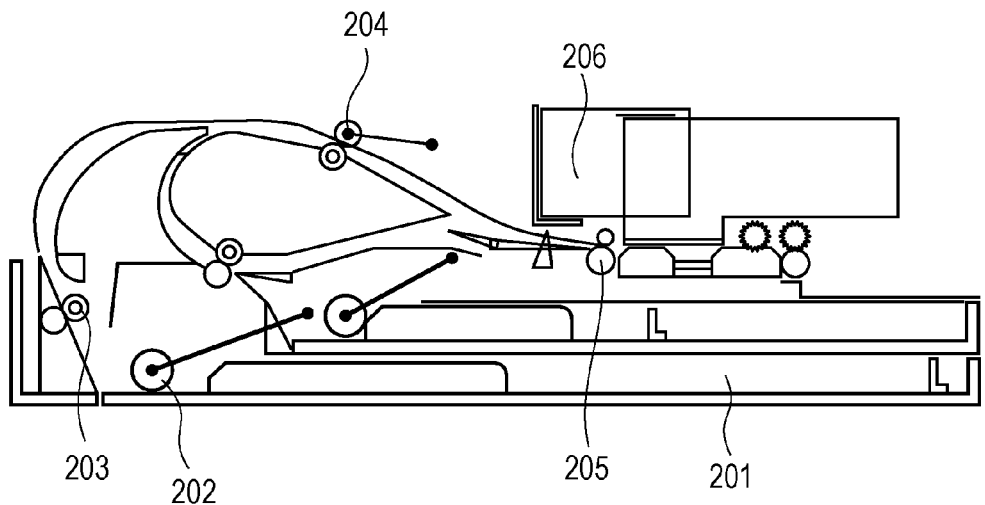
FIGS. 2A and 2B are a schematic cross-sectional view of a feeding path and an enlarged view of an operating portion of a printing device, respectively, in the print control apparatus according to the first embodiment.

FIG. 2A is a cross-sectional view of a feeding path in a mechanism portion of the printing apparatus 100 according to the first embodiment.

Figure 2B:
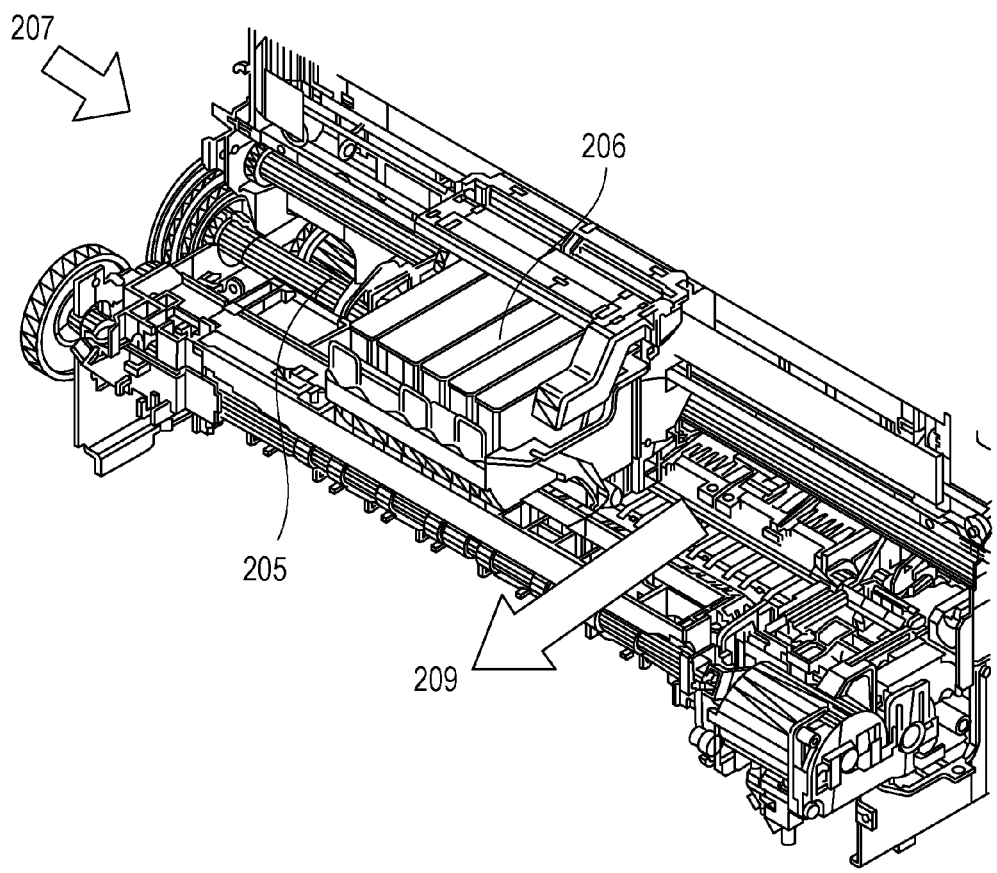

As illustrated in FIGS. 2A and 2B, the printing apparatus 100 includes a sheet setting unit 201 in which sheets of printing paper are set, a pickup roller 202, a first intermediate feeding roller 203, a second intermediate feeding roller 204, and a final feeding roller 205. Note that the sheet feeding device 108 described with reference to FIG. 1 includes the first intermediate feeding roller 203, the second intermediate feeding roller 204, and the final feeding roller 205.

Sheets of printing paper that are set in the sheet setting unit 201 are fed on a one-by-one basis into the printing apparatus 100 by the pickup roller 202. The sheets of printing paper that have been fed into the printing apparatus 100 are sequentially fed by the first intermediate feeding roller 203 and the second intermediate feeding roller 204 in the printing apparatus 100. After that, the sheets of printing paper are fed by the final feeding roller 205 to a print execution position that is located directly under a printing device 206. Note that the printing device 206 corresponds to the printing device 109 illustrated in FIG. 1.

FIG. 2B is an enlarged view of an operating portion of the printing device of the printing apparatus 100 illustrated in FIG. 2A. FIG. 2A is a cross-sectional view of the feeding path when the feeding path is viewed from a direction 207 illustrated in FIG. 2B.

As illustrated in FIG. 2B, a sheet of printing paper is fed in a feeding direction 209 by the feeding roller 205. While the printing device 206 is performing scanning in a main scanning direction orthogonal to the feeding direction 209, ink is applied onto the sheet of printing paper that is being fed in the feeding direction 209 (a sub-scanning direction), whereby printing is performed. The printing device 206 performs scanning in the main scanning direction, and starts an ink ejection operation from a predetermined position, whereby printing is performed.

However, in the case of feeding a sheet of printing paper having different thicknesses in a plane (more specifically, along a direction orthogonal to the feeding direction), such as an envelope, the sheet of printing paper may be fed while being inclined with respect to the feeding direction (hereinafter, referred to as "feed displacement"). Note that the feed displacement increases with increasing length of the feeding path.

Figure 3:
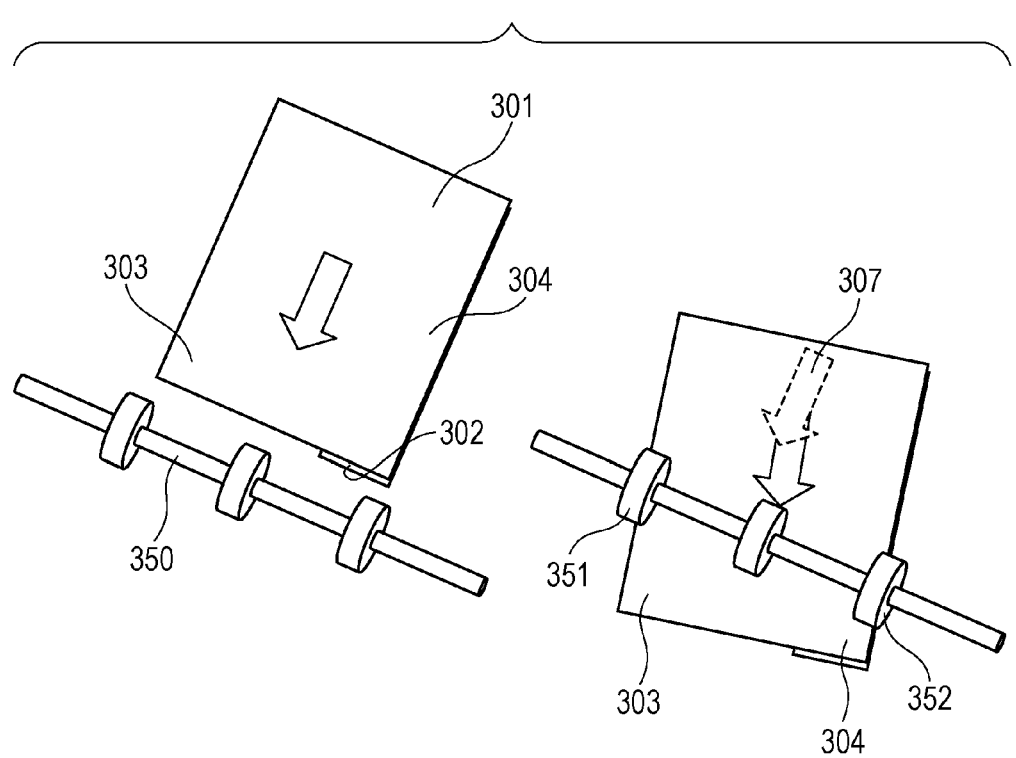
FIG. 3 is a diagram for explaining feed displacement of a recording medium.

Here, feed displacement during feeding will be described with reference to FIG. 3. FIG. 3 is a diagram for explaining feed displacement during feeding.

A sheet 301 of printing paper to which displacement easily occurs during feeding is a sheet of paper having different thicknesses along a direction orthogonal to the feeding direction in a plane, such as an envelope. Herein, regarding the term "direction orthogonal to the feeding direction", the angle defined by the direction and the feeding direction is not limited to 90°. The direction may cross the feeding direction, and the angle defined by the direction and the feeding direction may be some degrees larger or smaller than 90°. In other words, the sheet 301 of printing paper is a sheet of paper having portions along a direction parallel to the direction of an axis of a feeding roller 350, and the thickness of only one of the portions of the sheet of paper is large. In the case of the sheet 301 of printing paper (an envelope) illustrated in FIG. 3, the thickness of a portion that is a portion of the sheet 301 of printing paper and that a flap 302 overlies (a portion 304 of the sheet of printing paper) is comparatively larger than the thickness of a portion that is a portion of the sheet 301 of printing paper and that does not have the flap 302 (a portion 303 of the sheet of printing paper). In other words, in the case of the sheet 301 of printing paper, the flap 302 is present on only one of the left side and the right side along a direction orthogonal to the feeding direction (a direction toward the left or right side of the envelope). Thus, the thickness of the sheet 301 of printing paper on one of the left side and the right side is comparatively larger than the thickness of the sheet 301 of printing paper on the other side.

Here, the feeding roller 350 (each of the first intermediate feeding roller 203, the second intermediate feeding roller 204, and the final feeding roller 205 in the present embodiment) that is provided along the feeding path in the printing apparatus 100 has at least one roller portion that comes into contact with the sheet 301 of printing paper. In the present embodiment, the feeding roller 350 includes three roller portions (a first roller portion 351, a second roller portion 352, and a third roller portion). The individual roller portions come into contact with the left side, right side, and central portion, respectively, of the sheet 301 of printing paper. In the case where the sheet 301 of printing paper having different thicknesses along a direction orthogonal to the feeding direction is fed by the feeding roller 350, the first roller portion 351 that feeds the portion 303 of the sheet of printing paper which does not have the flap 302 has an intended feed force, and the portion 303 of the sheet of printing paper is fed by the feed force. In contrast, because the thickness of the portion 304 of the sheet of printing paper is larger due to the presence of the flap 302, a high feed load is imposed on the second roller portion 352 that feeds the portion 304 of the sheet of printing paper having the flap 302, compared with that imposed on the first roller portion 351. However, the second roller portion 352 and the first roller portion 351 operate using the same driving source. Thus, the second roller portion 352 does not have an intended feed force because of the feed load. Therefore, the feed amount of the portion 304 of the sheet of printing paper is smaller than that of the portion 303 of the sheet of printing paper. Accordingly, because the feed amount using the first roller portion 351 and the feed amount using the second roller portion 352 are not fixed amounts, the sheet 301 of printing paper is fed in a direction 307 that is inclined with respect to an intended feeding direction (hereinafter, referred to as a "reference feeding direction").

In FIG. 3, the sheet of printing paper is in a state of being displaced to the right with respect to the reference feeding direction. In the present embodiment, a state of being displaced to the right is defined as "+" displacement. In contrast, in the case where the sheet of printing paper is reversed by 180°, because the feed force of the first roller portion 351 is insufficient, the sheet of printing paper is in a state of being displaced to the left. This state is defined as "−" displacement.

Figure 4A:
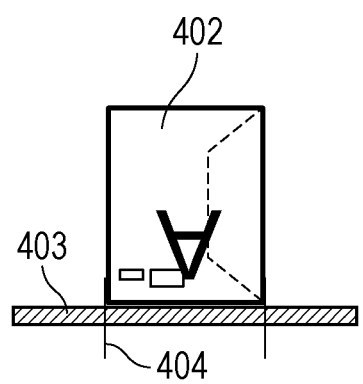
FIGS. 4A and 4B are diagrams for explaining displacement of the recording medium during feeding.
Figure 4B:
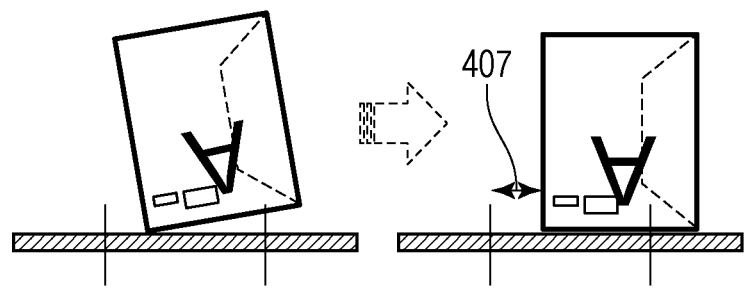

FIGS. 4A and 4B are diagrams for explaining feed displacement during feeding. With reference to FIGS. 4A and 4B, a state of being displaced to the right with respect to the reference feeding direction, i.e., the case of "+" displacement, will be described. FIG. 4A is an explanatory diagram for explaining the case where a sheet of printing paper is fed while being held in a straight position in the printing apparatus 100. FIG. 4B is an explanatory diagram for explaining the case where "+" displacement of the sheet of printing paper occurs in the printing apparatus 100.

As illustrated in FIG. 4A, in the case where a sheet 402 of printing paper is fed in a direction (the reference feeding direction) orthogonal to a feeding roller 403, the position of an end of the sheet 402 of printing paper matches a reference position 404.

In contrast, as illustrated in FIG. 4B, in the case where the sheet 402 of printing paper is fed while being inclined to the right (in the case where "+" displacement occurs), the inclined sheet of printing paper is corrected by a skew prevention operation so as to be in a straight position. Here, the skew prevention operation is an operation of placing an inclined sheet of paper at a position orthogonal to the feeding roller 403. In the present embodiment, the skew prevention operation is performed between the second intermediate feeding roller 204 and the final feeding roller 205. The skew prevention operation is not particularly limited thereto. For example, the skew prevention operation is performed using a well-known method such as a method described in Japanese Patent Publication No. 62-38261.

When the skew prevention operation is performed, the inclination of the sheet of printing paper with respect to the reference feeding direction is corrected, whereby the sheet of printing paper is positioned in the reference feeding direction. However, the position of the sheet of printing paper in a direction orthogonal to the reference feeding direction is displaced, compared with that in the case where the sheet of printing paper is fed in the reference feeding direction without being inclined. Herein, regarding the term "direction orthogonal to the reference feeding direction", the angle defined by the direction and the reference feeding direction is not limited to 90°. The direction may cross the reference feeding direction, and the angle defined by the direction and the reference feeding direction may be some degrees larger or smaller than 90°. In other words, the sheet of printing paper is placed at a position that is displaced by a predetermined amount 407 of displacement from the reference position 404. As illustrated in FIG. 4B, correction is performed using, as a point of support, a portion that is a portion of the sheet of printing paper and that is in contact with the feeding roller. Thus, the amount of displacement in a direction orthogonal to the reference feeding direction in the case where the sheet of printing paper is in contact with the feeding roller 403 is the amount 407 of displacement of the sheet of printing paper that has been subjected to the skew prevention operation. As described above, in the case where the sheet 301 of printing paper is fed so that the thick portion (the flap 302) of the sheet 301 of printing paper is positioned on one of the two sides along a direction orthogonal to the reference feeding direction, feed displacement occurs in the direction (the main scanning direction) orthogonal to the reference feeding direction. Note that the feed displacement tends to increase with increasing length of the feeding path.

Figures 5, 6:
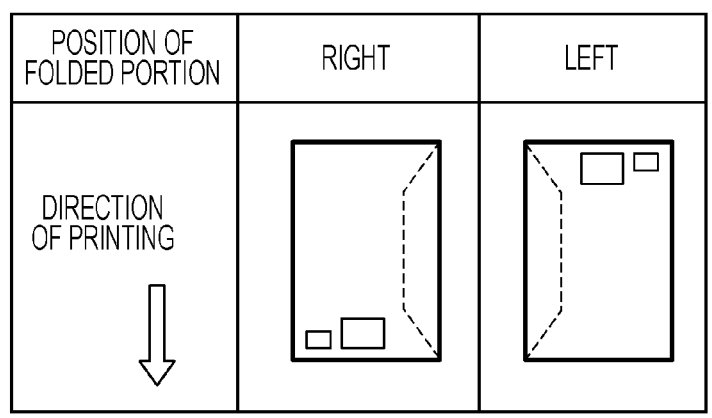
FIG. 5 is an explanatory diagram of the relationships between a state in which the recording medium is set and the position of a folded portion in the first embodiment.
FIG. 6 is a diagram of the relationships among the type of recording medium, the position of the folded portion, and a correction value for a print position in the print control apparatus according to the first embodiment.

FIG. 5 is a diagram of the relationships between a state in which a sheet of printing paper is set and the position of a folded portion in the printing apparatus according to the first embodiment. Here, regarding the state in which a sheet of printing paper is set, it is assumed that a sheet of printing paper is correctly set in accordance with an instruction provided via a manual or a user interface (UI). In other words, in the case where an instruction to set a sheet of printing paper has been provided via the manual or UI, it is determined that a user has set a sheet of printing paper in accordance with the instruction provided via the manual or UI.

In FIG. 5, an envelope having a flap on a side thereof (along a direction orthogonal to the reference feeding direction) is illustrated as an example of a sheet of printing paper to which feed displacement described with reference to FIG. 3 occurs. When the state in which the sheet of printing paper is set is a state 501, the position of the flap (referred to as the "position of a folded portion") is on the right side. Furthermore, when the state in which the sheet of printing paper is set is a state 502, the position of the flap is on the left side. Regarding folded-portion position information concerning the position of a folded portion, when data to be used in printing is generated by an external apparatus, for example, contents such as right or left are embedded as the folded-portion position information in the data to be used in printing, in accordance with an assumed state in which the sheet of printing paper is set. In the case of a print process described below, the folded-portion position information is extracted from the RAM 103 by a control program stored in the ROM 102.

FIG. 6 is a diagram illustrating an example of the relationships among a sheet type that is the type of sheet of printing paper, the position of the folded portion, and a correction value for a print position. It is assumed that the correction value for the print position is a value which is obtained on the basis of the sheet type and the position of the folded portion by an experiment or by measurement.

The sheet type can be determined on the basis of a sheet size, i.e., a width (W) and a height (H). In the present embodiment, the correction value for the print position is set on the basis of the sheet type and the position of the folded portion that has been described with reference to FIG. 5. For example, a sheet type A has a size of a width (W) of 2475 pixels and a height (H) of 5700 pixels. A correction value in the case where the position of the folded portion is on the right side is −100, and, a correction value in the case where the position of the folded portion is on the left side is 100. Here, the relationships among the sheet type, the sheet size, and the correction value are held in the RAM 103 in advance. When the type of sheet of printing paper matches one of sheet types included in the relationship diagram, a correction value for the print position based on the position of the folded portion is present. However, when the type of sheet of printing paper does not match any one of sheet types included in the relationship diagram, the correction value for the print position based on the position of the folded portion is set to be zero.

Note that the reason why different correction values are set on the basis of sheet types is that the amount of inclination differs with the length or the like of a sheet of printing paper along the reference feeding direction. In other words, when correction is performed by the skew prevention operation or the like, the amount of displacement illustrated in FIGS. 4A and 4B changes with the amount of inclination. Note that the correction value is set on the basis of the size of the sheet of printing paper (and the position of the folded portion). However, the correction value may be set on the basis of a material of which the sheet of printing paper is made (and the position of the folded portion). Alternatively, the correction value may be set on the basis of the size of the sheet of printing paper and the material of which the sheet of printing paper is made (and the position of the folded portion).

The relationships among the sheet type, the position of the folded portion, and the correction value for the print position that are illustrated in FIG. 5 are stored in advance in the RAM 103 or the like.

Figure 7:
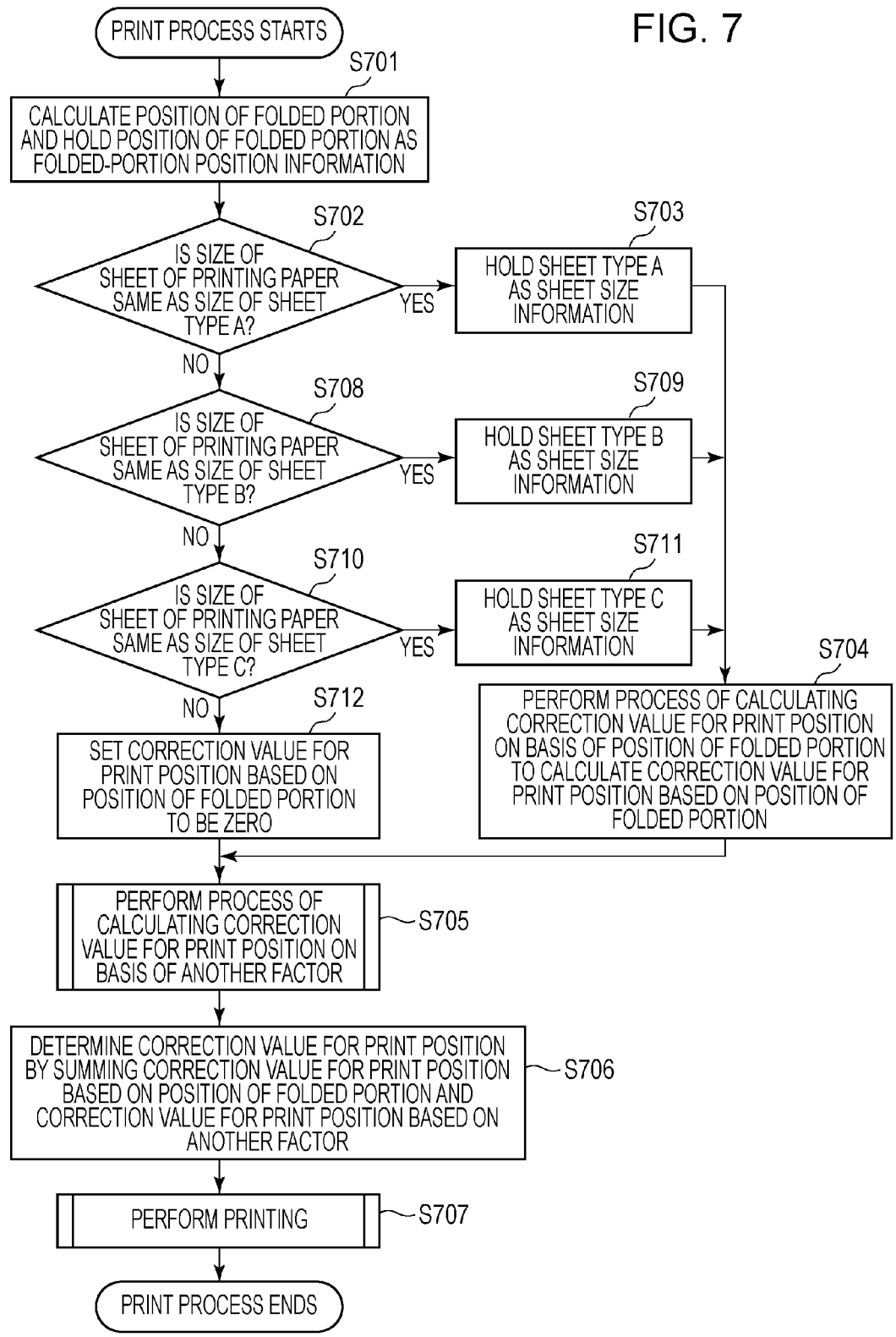
FIG. 7 is a flowchart of a control flow performed in the print control apparatus according to the first embodiment.

FIG. 7 is a flowchart of a control flow of a print process that is performed by the CPU 101 in the first embodiment. The control flow is performed when a program stored in the ROM 102 receives a print instruction. Furthermore, the print process includes a process of correcting the print position.

When the print process starts, first, the position of the folded portion is calculated, and stored as folded-portion position information (step S701). Note that, for example, when data to be used in printing is acquired via the communication I/F 105, the position of the folded portion is acquired from an external apparatus, or when data to be used in printing is acquired via the memory card I/F 106, the position of the folded portion is acquired from an image processing unit.

Next, whether or not the size of a sheet of printing paper is the same as the size of the sheet type A is checked (step S702). When the size of the sheet of printing paper is the same as the size of the sheet type A, the sheet type A is held as sheet size information (step S703). A process of calculating a correction value for the print position on the basis of the position of the folded portion is performed using the folded-portion position information, which has been held in step S701, and the sheet size information, which has been held in step S703. Accordingly, a correction value for the print position based on the position of the folded portion is calculated (step S704). In other words, a correction value is determined by acquiring a correction value for the print position as correction information from the RAM 103 or the like. After that, the process proceeds to step S705.

In contrast, when the size of the sheet of printing paper is not the same as the size of the sheet type A, whether or not the size of the sheet of printing paper is the same as the size of the sheet type B is checked (step S708). When the size of the sheet of printing paper is the same as the size of the sheet type B, the sheet type B is held as sheet size information (step S709). The process of calculating a correction value for the print position on the basis of the position of the folded portion is performed using the folded-portion position information, which has been held in step S701, and the sheet size information, which has been held in step S709. Accordingly, a correction value for the print position based on the position of the folded portion is calculated (step S704), and the process proceeds to step S705.

When the size of the sheet of printing paper is not the same as the size of the sheet type B, whether or not the size of the sheet of printing paper is the same as the size of the sheet type C is checked (step S710). When the size of the sheet of printing paper is the same as the size of the sheet type C, the sheet type C is held as sheet size information (step S711). The process of calculating a correction value for the print position on the basis of the position of the folded portion is performed using the folded-portion position information, which has been held in step S701, and the sheet size information, which has been held in step S711. Accordingly, a correction value for the print position based on the position of the folded portion is calculated (step S704), and the process proceeds to step S705.

In contrast, when it is determined in step S710 that the size of the sheet of printing paper is not the same as the size of the sheet type C, i.e., when the size of the sheet of printing paper is different from any one of the sheet sizes A to C, the correction value for the print position based on the position of the folded portion is set to be zero (step S712), and the process proceeds to step S705.

In step S705, a process of calculating a correction value for the print position on the basis of another factor is performed. Accordingly, a correction value for the print position based on another factor is calculated. Here, the correction value for the print position based on another factor is a correction value other than a correction value that is calculated on the basis of different thicknesses of the sheet of printing paper along a direction orthogonal to the feeding direction. The correction value for the print position based on another factor is not particularly limited. Examples of the correction value for the print position based on another factor include a correction value in the case of duplex printing.

Next, a correction value for the print position in the case of performing printing is determined using the correction value for the print position based on the position of the folded portion and the above-described correction value for the print position based on another factor (step S706). Here, by summing the correction value for the print position based on the position of the folded portion (step S704 or S712) and the correction value for the print position based on another factor (step S705), a correction value for the print position in the case of performing printing is determined.

A print start position is changed on the basis of the correction value determined in step S706, and printing is performed (step S707). In the present embodiment, in the case of performing printing, timing at which printing starts while the printing device 109 is moving in the main scanning direction is controlled using the correction value determined in step S706, thereby controlling the print position on the sheet of printing paper. Note that the method for changing the print start position is not limited thereto. For example, without changing the timing at which printing starts, a position at which a print operation of the printing device 109 starts may be changed on the basis of the correction value. Alternatively, both the timing at which printing starts and the position at which the print operation of the printing device 109 starts may be changed on the basis of the correction value.

In the present embodiment, in the case where a sheet of printing paper has different thicknesses along a direction orthogonal to the feeding direction, feed displacement occurs during feeding. Thus, the correction process of adjusting the print position in the direction orthogonal to the feeding direction on the basis of the type of sheet of printing paper and the position of the folded portion is performed, and printing is performed. In other words, taking into consideration the fact that the position of a recording medium (a sheet of paper) is displaced in the main scanning direction by correcting the inclination of the recording medium with respect to the reference feeding direction through the skew prevention operation or the like, the correction process of adjusting the print position is performed, whereby printing is performed at a desired position on the recording medium. Accordingly, without providing, for example, a non-contact sensor that detects an end of a sheet of paper, printing at a desired position on a recording medium can be realized at a low cost.

Second Embodiment

A present embodiment will be described with reference to FIGS. 8 to 10. In the present embodiment, a process of correcting the print position is performed on the basis of the sheet type, the position of a folded portion, and the orientation of an image.

FIG. 8 is a diagram illustrating the relationships among the orientation of an image, the position of a folded portion, and a state in which a sheet of paper is set.

Regarding the state in which a sheet of printing paper is set, it is assumed that a sheet of printing paper is correctly set in accordance with an instruction provided using a user operation or the like via the manual or the UI. In other words, in the case where an instruction to set a sheet of printing paper has been provided via the manual or the UI, it is determined that a user has set a sheet of printing paper in accordance with the instruction provided via the manual or the UI.

In FIG. 8, an envelope having a folded portion on a side thereof is illustrated as an example of a sheet of paper to which feed displacement occurs. When the orientation of an image is 0°, the position of the folded portion is on the right side of a sheet of printing paper (the envelope). When the orientation of the image is 180°, the position of the folded portion is on the left side of the sheet of printing paper. Furthermore, when the orientation of the image is 90°, the position of the folded portion is on the left side of the sheet of printing paper. When the orientation of the image is 270°, the position of the folded portion is on the right side of the sheet of printing paper.

Here, regarding image rotation information concerning the orientation of an image, for example, a value of a rotation angle (0, 90, 180, or 270) is embedded as the image rotation information in data to be used in printing, in accordance with an image rotation process that is performed when the data to be used in printing is generated by an external apparatus. The image rotation information is extracted from the RAM 103 by a control program stored in the ROM 102.

FIG. 9 is a diagram illustrating the relationships among the sheet type, the orientation of the image, and a correction value for the print position in the second embodiment. It is assumed that the correction value for the print position is a value which is obtained on the basis of the sheet type and the orientation of the image by an experiment or by measurement as in the first embodiment. Note that, in FIG. 9, the relationships between the orientation of the image and the correction value for the print position are illustrated. In other words, the correction value for the print position is set not on the basis of the position of the folded portion but on the basis of the orientation of the image. Note that correction values for the print position in the cases where the position of the folded portion is on the right side, i.e., in the case where the orientation of the image is 0° and the case where the orientation of the image is 270° (see FIG. 8), are the same. In contrast, correction values for the print position in the cases where the position of the folded portion is on the left side, i.e., in the case where the orientation of the image is 90° and the case where the orientation of the image is 180° (see FIG. 8), are the same. In this manner, the correction value for each sheet type is set on the basis of the orientation of the image, and set with consideration of the position of the folded portion.

The sheet type can be determined on the basis of a sheet size, i.e., a width (W) and a height (H). The correction value for the print position is set on the basis of the relationships between the sheet type and the orientation of the image. For example, in the case of the size of the sheet type A, a correction value in the case where the orientation of the image is 0° is −100, and a correction value in the case where the orientation of the image is 180° is 100.

The relationships among the sheet type, the orientation of the image, and the correction value for the print position which are illustrated in FIG. 9 are stored in the RAM 103.

Figure 10:
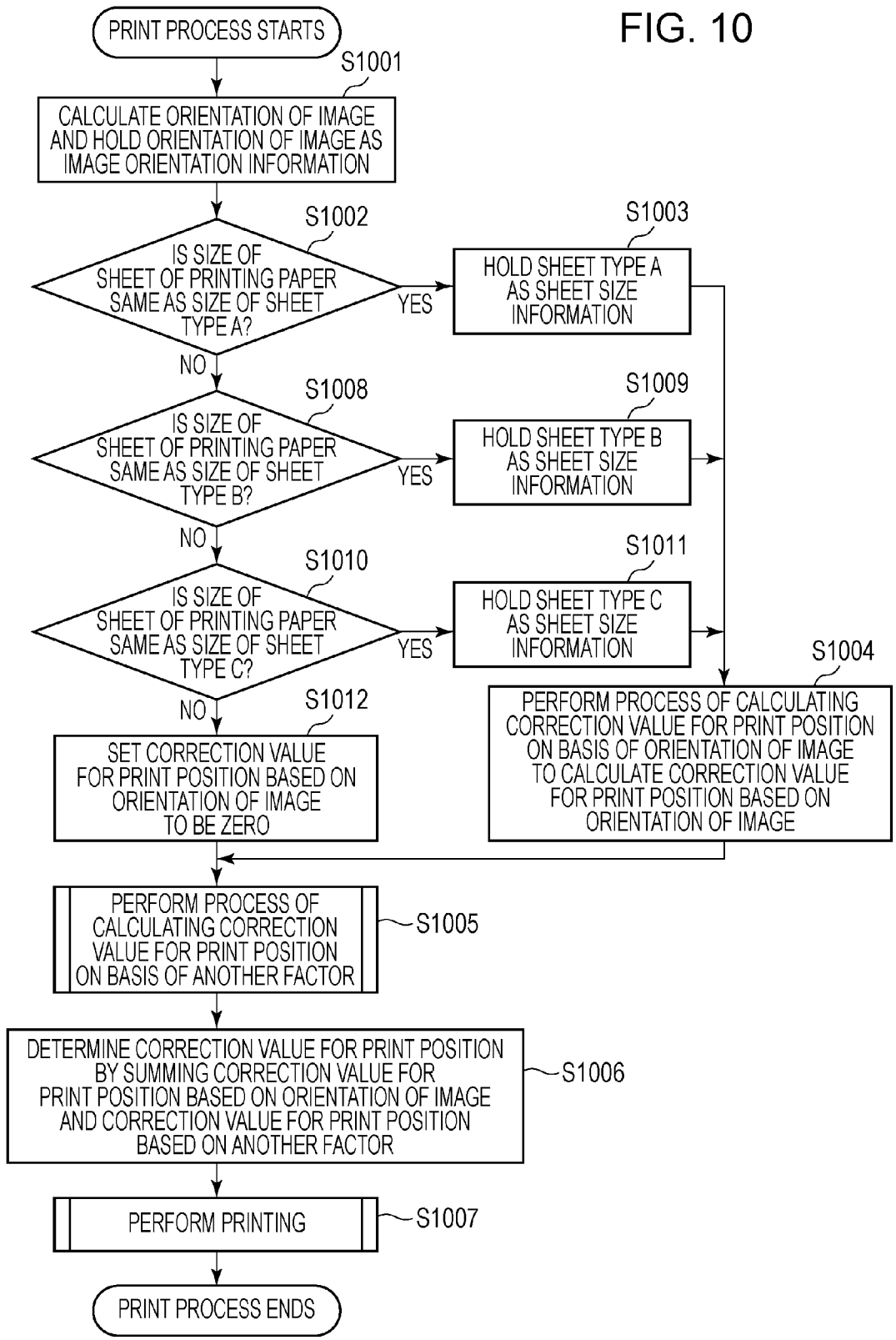
FIG. 10 is a flowchart of a control flow performed in the print control apparatus according to the second embodiment.

FIG. 10 is a flowchart of a control flow of a print process that is performed by the CPU 101 in the second embodiment. The control flow is performed when a program stored in the ROM 102 receives a print instruction. Furthermore, the print process includes a process of correcting the print position.

When the print process starts, first, the orientation of the image is extracted, and stored as image orientation information (step S1001). Note that, for example, when data to be used in printing is acquired via the communication I/F 105, the orientation of the image is calculated by an external apparatus, or when data to be used in printing is acquired via the memory card I/F 106, the orientation of the image is calculated by the image processing unit. Next, whether or not the size of a sheet of printing paper is the same as the size of the sheet type A is checked (step S1002). When the size of the sheet of printing paper is the same as the size of the sheet type A, the sheet type A is held as sheet size information (step S1003). A process of calculating a correction value for the print position is performed using the image orientation information, which has been held in step S1001, and the sheet size information, which has been held in step S1003. Accordingly, a correction value for the print position based on the orientation of the image is calculated (step S1004). In other words, a correction value for the print position based on the orientation of the image is determined by acquiring a correction value for the print position as correction information from the RAM 103. After that, the process proceeds to step S1005.

In contrast, when the size of the sheet of printing paper is not the same as the size of the sheet type A, whether or not the size of the sheet of printing paper is the same as the size of the sheet type B is checked (step S1008). When the size of the sheet of printing paper is the same as the size of the sheet type B, the sheet type B is held as sheet size information (step S1009). The process of calculating a correction value for the print position is performed using the image orientation information, which has been held in step S1001, and the sheet size information, which has been held in step S1009. Accordingly, a correction value for the print position based on the orientation of the image is calculated (step S1004), and the process proceeds to step S1005.

When the size of the sheet of printing paper is not the same as the size of the sheet type B, whether or not the size of the sheet of printing paper is the same as the size of the sheet type C is checked (step S1010). When the size of the sheet of printing paper is the same as the size of the sheet type C, the sheet type C is held as sheet size information (step S1011). The process of calculating a correction value for the print position is performed using the image orientation information, which has been held in step S1001, and the sheet size information, which has been held in step S1011. Accordingly, a correction value for the print position based on the orientation of the image is calculated (step S1004), and the process proceeds to step S1005.

In contrast, when it is determined in step S1010 that the size of the sheet of printing paper is not the same as the size of the sheet type C, i.e., when the size of the sheet of printing paper is different from any one of the sheet sizes A to C, the correction value for the print position based on the orientation of the image is set to be zero (step S1012), and the process proceeds to step S1005.

Next, a correction value for the print position in the case of performing printing is determined using the correction value for the print position based on the orientation of the image and a correction value for the print position based on another factor (step S1006). Here, by summing the correction value for the print position based on the orientation of the image (step S1004 or S1012) and the correction value for the print position based on another factor (step S1005), a correction value for the print position in the case of performing printing is determined.

The print start position is changed on the basis of the correction value determined in step S1006, and printing is performed (step S1007). In the present embodiment, in the case of performing printing, timing at which printing starts while the printing device 109 is moving in the main scanning direction is controlled using the correction value determined in step S1006, thereby controlling the print position on the sheet of printing paper.

In the present embodiment, in the case where a sheet of printing paper having different thicknesses along a direction orthogonal to the feeding direction, feed displacement occurs during feeding. Thus, the correction process of adjusting the print position in the direction orthogonal to the feeding direction on the basis of the type of sheet of printing paper and the orientation of the image is performed, and printing is performed. In other words, taking into consideration the fact that the position of a recording medium (a sheet of paper) is displaced in the main scanning direction by correcting the inclination of the recording medium with respect to the reference feeding direction through the skew prevention operation or the like, the correction process of adjusting the print position is performed, whereby printing is performed at a desired position on the recording medium. Accordingly, without providing, for example, a non-contact sensor that detects an end of a sheet of paper, printing at a desired position on a recording medium can be realized at a low cost.

As described above, the present invention is described using the embodiments. However, the basic configuration in the present invention is not limited to any one of the above-described configurations. For example, in the foregoing embodiments, determination of the size of a sheet of printing paper is performed in the order of the sheet sizes A, B, and C. However, the order in which determination of the size of a sheet of printing paper is performed is not limited thereto. Furthermore, in the foregoing embodiments, the present invention is described by providing, as an example, a case where the three sheet types A to C are present as sheet types. However, also in a case where sheet types such as sheet types D, E, and F are further added, processing can be performed as in the case described with reference to FIG. 7.

In the foregoing embodiments, the present invention is described by providing an envelope as an example of a sheet of printing paper. However, the example of a sheet of printing paper is not limited thereto. In the case where a recording medium has different thicknesses along a direction orthogonal to the feeding direction, similarly, printing at a desired position on the recording medium can be realized. Here, a case where the thickness of a recording medium on one end side thereof and the thickness of the recording medium on the other end side thereof along a direction orthogonal to the feeding direction are different from each other may be provided as the case where a sheet of printing paper has different thicknesses along a direction orthogonal to the feeding direction. Furthermore, a case where a recording medium has different thicknesses along a direction orthogonal to the feeding direction because an ornament or the like is provided on one portion of the recording medium may be provided. In this case, a correction value may be calculated in advance on the basis of the type of recording medium and the orientation of the recording medium, and the print start position may be changed on the basis of the correction value. Moreover, in the foregoing embodiments, a case where a recording medium has different thicknesses along a direction orthogonal to the feeding direction is described. However, a case where the feeding roller has at least two rollers and where different feed loads are imposed on the individual rollers due to a factor other than the thickness of the recording medium may also be provided similarly. For example, a first roller rotates in contact with a first region of the recording medium, a second roller rotates in contact with a second region of the recording medium, and the thickness of the recording medium in the first region and the thickness of the recording medium in the second region are different from each other, whereby the feeding roller feeds the recording medium. In this case, a correction value may be calculated in advance on the basis of the feed loads, and the print start position may be changed on the basis of the correction value.

In the foregoing embodiments, a table of correction values for the print position is stored in the RAM 103, and, in the case of the correction process, a certain correction value is acquired as correction information from the table. However, the place in which the table is stored is not limited thereto, and the table may be stored in another place. In the foregoing embodiments, the correction value is set on the basis of the size of a recording medium and the position of a folded portion or the orientation of an image. In other words, in the first embodiment, the correction information (the correction value) is set for each size of the recording medium and for each orientation of the recording medium. In the second embodiment, the correction information (the correction value) is set for each size of the recording medium and for each orientation of the image on the recording medium. However, the correction information (the correction value) is not limited thereto. For example, the correction value may be set on the basis of a material of which the recording medium is made and the orientation of the folded portion or the orientation of the image, i.e., for each material of which the recording medium is made and for each orientation of the folded portion or each orientation of the image. Alternatively, the correction value may be set on the basis of the size of the recording medium, the material of which the recording medium is made, and the orientation of the folded portion or the orientation of the image. Alternatively, the correction value may be set on the basis of only the orientation of the folded portion of the recording medium or the orientation of the image on the recording medium, although the accuracy at which the print position is adjusted may be reduced, compared with that in the first embodiment or second embodiment. Furthermore, the correction value may be set with consideration of a distance for which the recording medium is fed or the number of feeding rollers along the feeding path along which the recording medium is fed. Moreover, the correction value may be set in a step-by-step manner on the basis of, for example, which is larger, the thickness of the recording medium along the left direction or the thickness of the recording medium along the right direction among directions orthogonal to the feeding direction in which the recording medium is fed. Additionally, whether or not the print start position is to be moved may be determined on the basis of the feed distance for which the recording medium is fed. In the case where the feed distance for which the recording medium is fed is short, e.g., in the case where a position at which the recording medium is fed is close to the printing device 109, no correction information may be acquired or a correction value of zero may be set as the correction information. In the case where the feed distance for which the recording medium is fed is long, correction information may be acquired.

Furthermore, the printing apparatus may have a weighting unit. In the case where the printing apparatus has a weighting unit, when printing at a correct position on a recording medium is not possible even when a weight is applied to the recording medium by the weighting unit, correction using correction information may be performed. In other words, in the case where displacement occurs after a weight has been applied by the weight unit, a correction value may be calculated in advance, and the print start portion may be changed on the basis of the correction value.

In each of the foregoing embodiments, the correction process for printing is performed in the printing apparatus. However, the apparatus in which the correction process is performed is not limited to the printing apparatus. For example, the correction process may be performed in an external apparatus such as a personal computer (PC).

According to the present invention, printing at a desired position on a recording medium can be more certainly realized.

Note that, in each of the foregoing embodiments, the present invention is described by providing, as an example, the printing apparatus employing an inkjet recording system. However, the printing apparatus is not limited thereto. For example, the printing apparatus may employ an electrophotographic system using toner as a color material. Furthermore, the printing apparatus may be a single-function printer having, for example, only a recording function. Alternatively, the printing apparatus may be a multi-function printer having multiple functions such as a recording function, a facsimile (FAX) function, and a scanner function. Alternatively, the printing apparatus may be a production apparatus for producing, for example, a color filter, an electronic device, an optical device, or a fine structure in a predetermined recoding manner.

Note that the term "recording" in the foregoing embodiments refers to not only a case where significant information such as characters or graphics is formed, and whether or not a target for recording is significant does not matter. Furthermore, whether or not the target for recording is made apparent so that a person can visually perceive the target for recording does not also matter. The term "recording" also broadly refers to a case where an image, a design, a pattern, a structure, or the like is formed on a recording medium or a case where a medium is subjected to processing. Furthermore, the term "recording medium" refers to not only paper used in a typical recording apparatus, but also an object that can accept ink, such as cloth, a plastic film, a metallic plate, glass, ceramics, a resin, wood, or leather. Moreover, the term "ink" refers to a liquid that can be used in formation of an image, a design, a pattern, or the like on a recording medium or in processing of a recording medium by being applied onto the recording medium, or in a process performed on ink (for example, solidification or insolubilization of a color material included in ink to be applied to a recording medium).

Furthermore, not all of the above-described processes need to be realized by software, and some or all of the processes may be realized by hardware.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-203093, filed Sep. 14, 2012, which is hereby incorporated by reference herein in its entirety.

What is claimed is:

1. An apparatus comprising:
an acquisition unit configured to, in a case of a recording medium having different thicknesses along a direction crossing a feeding direction in which the recording medium is fed by a feeding unit, acquire correction information that is set on the basis of an orientation of the recording medium in the case where the recording medium is fed by the feeding unit; and
a controller configured to determine a print start position of a print unit in the direction crossing the feeding direction on the basis of the correction information acquired by the acquisition unit,
wherein the feeding unit includes a feeding roller having a first roller portion and a second roller portion along the direction crossing the feeding direction, and
wherein the feeding roller feeds the recording medium in such a manner that the first roller portion rotates in contact with a first region of the recording medium and the second roller portion rotates in contact with a second region of the recording medium, a thickness of the recording medium in the first region and a thickness of the recording medium in the second region being different from each other.

2. The apparatus according to claim 1, wherein the correction information is set at least one of for each size of the recording medium and for each material of which the recording medium is made.

3. The apparatus according to claim 1, wherein the recording medium is an envelope.

4. The apparatus according to claim 1, wherein, in a case where a thickness of the recording medium on one end side thereof and a thickness of the recording medium on the other end side thereof along the direction crossing the feeding direction are different from each other, the acquisition unit acquires the correction information.

5. A method comprising:
acquiring, in a case of a recording medium having different thicknesses along a direction crossing a feeding direction in which the recording medium is fed by a feeding unit, correction information that is set on the basis of an orientation of the recording medium in a case where the recording medium is fed by the feeding unit; and
determining a print start position of a print unit in the direction crossing the feeding direction on the basis of the correction information acquired in the acquiring,
wherein the feeding unit includes a feeding roller having a first roller portion and a second roller portion along the direction crossing the feeding direction, and
wherein the feeding roller feeds the recording medium in such a manner that the first roller portion rotates in contact with a first region of the recording medium and the second roller portion rotates in contact with a second region of the recording medium, a thickness of the recording medium in the first region and a thickness of the recording medium in the second region being different from each other.

6. The method according to claim 5, wherein the correction information is set at least one of for each size of the recording medium and for each material of which the recording medium is made.

7. The method according to claim 5, wherein the recording medium is an envelope.

8. The method according to claim 5, wherein, in a case where a thickness of the recording medium on one end side thereof and a thickness of the recording medium on the other end side thereof along the direction crossing the feeding direction are different from each other, the correction information is acquired in the acquiring.

9. A non-transitory computer-readable recording medium storing a program for causing a computer to function as each of the acquisition unit and the controller included in the apparatus according to claim 1.

10. The apparatus according to claim 1, wherein the first roller portion and a second roller portion is operated by a same driving source.

11. The apparatus according to claim 1, wherein the correction information is information for specifying a correction value for a print start position of a print unit in the direction crossing.

12. The apparatus according to claim 1, further comprising the print unit.

13. The method according to claim 5, wherein the first roller portion and a second roller portion is operated by a same driving source.

14. The method according to claim 5, wherein the correction information is information for specifying a correction value for a print start position of a print unit in the direction crossing.

* * * * *